(12) United States Patent
Vermunicht et al.

(10) Patent No.: US 7,645,507 B2
(45) Date of Patent: Jan. 12, 2010

(54) PROTECTIVE FILMS AND PRESSURE SENSITIVE ADHESIVES

(75) Inventors: Geert Vermunicht, Ottignies (BE); Karin Morren, Ottignies (BE); Kathryn Wright, Katy, TX (US); Sharman McGilbert, Houston, TX (US)

(73) Assignee: Kraton Polymers U.S. LLC, Houston, TX (US)

(*) Notice: Subject to any disclaimer, the term of this patent is extended or adjusted under 35 U.S.C. 154(b) by 912 days.

(21) Appl. No.: 11/256,819

(22) Filed: Oct. 24, 2005

(65) Prior Publication Data

US 2007/0092722 A1   Apr. 26, 2007

(51) Int. Cl.
  *B32B 7/12*   (2006.01)
(52) U.S. Cl. ............... 428/355 BL; 428/355 R; 526/931
(58) Field of Classification Search ........... 526/931, 526/329.1, 329.2; 428/355 R, 355 BL
  See application file for complete search history.

(56) References Cited

U.S. PATENT DOCUMENTS

| | | | |
|---|---|---|---|
| 3,113,986 A | 12/1963 | Breslow et al. | |
| 3,231,635 A | 1/1966 | Holden et al. | |
| 3,251,905 A | 5/1966 | Zelinski | |
| 3,390,207 A | 6/1968 | Moss et al. | |
| RE27,145 E | 6/1971 | Jones | |
| 3,598,887 A | 8/1971 | Darcy et al. | |
| 4,089,824 A * | 5/1978 | Bronstert et al. | ............ 524/534 |
| 4,219,627 A | 8/1980 | Halasa et al. | |
| 4,226,952 A | 10/1980 | Halasa et al. | |
| 4,960,820 A | 10/1990 | Hwo | |
| 5,039,755 A | 8/1991 | Chamberlain et al. | |
| 5,427,850 A | 6/1995 | Gotoh et al. | |
| 5,777,043 A | 7/1998 | Shafer et al. | |
| 6,465,557 B1 | 10/2002 | De Keyzer et al. | |

FOREIGN PATENT DOCUMENTS

| | | |
|---|---|---|
| EP | 0 413 294 A2 | 2/1991 |
| EP | 0 387 671 B1 | 11/1993 |
| EP | 0 636 654 B1 | 10/1997 |
| WO | 94/22931 | 10/1994 |
| WO | 00/77118 | 12/2000 |
| WO | 03/064527 A2 | 8/2003 |
| WO | 03/064528 A2 | 8/2003 |

* cited by examiner

*Primary Examiner*—Thao T. Tran
(74) *Attorney, Agent, or Firm*—Gregory N. Clements

(57) ABSTRACT

Protective film in the form of a tape or sheet comprising a substrate layer and a pressure sensitive adhesive composition.

11 Claims, No Drawings

PROTECTIVE FILMS AND PRESSURE SENSITIVE ADHESIVES

FIELD OF THE INVENTION

The present invention relates to pressure sensitive adhesive compositions and protective films that contain said pressure sensitive adhesive compositions. More particularly, the present invention relates to protective films in the form of tapes or sheets, comprising a substrate layer of a homopolymer or copolymer of α-olefins, preferably of ethylene and/or propylene, and a pressure sensitive adhesive composition comprising at least one block copolymer, derived from vinyl aromatics and conjugated dienes, a tackifying resin and/or a poly(α-olefin) or a plasticizer.

BACKGROUND OF THE ART

U.S. Pat. No. 6,465,557 B1 (KRATON Polymers U.S. LLC) discloses a hot-melt, pressure sensitive positioning adhesive for use in an adsorbent article such as sanitary napkins, incontinent pads, feminine pads, panty shields and diaper inserts.

Said adhesive comprises:

a. from 6 to 15 percent by weight of a hydrogenated styrene-(butadiene and/or isoprene)-styrene block copolymer, having a vinyl content of greater than 50% by weight, b. from 50 to 80 percent by weight of a tackifying resin, which has an aromaticity such that the MMAP cloud point is at least 45° C., and c. from 5 to 35 percent by weight of a plasticizer, wherein the weight percentages of the total components a), b) and c) and the sum of the three components add up to 100.

In U.S. Pat. No. 6,465,557 B1, the preferred vinyl contents in the block copolymer before hydrogenation are those in the range of from 70 to 80 wt %, while the preferred block copolymer content in the adhesive composition is from 8 to 11 percent by weight. Preferred poly(styrene) contents in the block copolymer are in the range of from 10 to 40 percent by weight.

A clear disadvantage of the described and exemplified adhesive compositions of U.S. Pat. No. 6,465,557 B1 is that they comprise large amounts of plasticizing oils such as TUF-FLO 6056, which have been found to leave residues on the surface to be protected by the protective film after the film is removed. It will be appreciated that these residues on the surfaces to be protected are unacceptable for several types of products.

U.S. Pat. No. 5,427,850 (Sekisui Chemical Co.) discloses a pressure sensitive adhesive composition comprising 100 parts by weight of at least one block copolymer selected from the group consisting of block copolymers represented by the general formula A-B-A and block copolymers represented by the general formula A-B, wherein A denotes a styrene polymer block and B denotes a butadiene polymer block, an isoprene polymer block or a polymer block obtained by hydrogenating these polymers, 10 to 200 parts by weight of a tackifying resin and 25 to 200 parts by weight of a polyolefin. Pressure sensitive adhesive tapes or sheets comprising, as a pressure sensitive adhesive layer, the pressure sensitive adhesive composition are also disclosed.

WO 00/77118 (KRATON Polymers Research BV) discloses an adhesive composition comprising: (i) a block copolymer containing at least two poly(monovinyl aromatic hydrocarbon) blocks and at least one hydrogenated poly(conjugated diene) block; (ii) 20 to 80 parts by weight of an at least partially hydrogenated tackifying resin per 100 parts by weight of block copolymer; (iii) 0 to 40 parts by weight of aromatic resin per 100 parts by weight of block copolymer; (iv) 10 to 60 parts by weight of a polybutene-1 per 100 parts by weight of block copolymer; and (v) 0 to 25 parts by weight of plasticizer per 100 parts by weight of block copolymer. Said document further discloses a process for preparing pellets containing the adhesive composition and a protective film comprising a substrate layer and an adhesive layer comprising the adhesive composition as defined above, made for instance, by co-extrusion.

The compositions according to U.S. Pat. No. 5,427,850 and WO 00/77118 have in common that they comprise a styrenic block copolymer, a midblock compatible tackifying resin (i.e., compatible with the hydrogenated poly(conjugated diene) block) and a polyolefin. The latter is generally the cheapest component of the composition. It is therefore used in large amounts. On the other hand, the polyolefin does not contribute to the desirable properties of the adhesive composition. For instance, producers of protective films are on the look out for adhesive compositions that may contain a lot of cheap polyolefins while still having excellent adhesive properties (generally determined on the basis of peal adhesion) and good processability (generally determined on the basis of Melt Flow Rate).

Accordingly, it would be desirable to have a pressure sensitive adhesive composition that combines a high peel adhesion with a Melt Flow Rate (MFR according to ASTM D-1238, Condition E, 190° C. at 2.16 kg load) from 5 to 20 g/10 min.

SUMMARY OF THE INVENTION

The present invention relates to pressure sensitive adhesive compositions and to protective films in the form of tape or sheets that comprise a substrate layer and said pressure sensitive adhesive compositions. The pressure sensitive adhesive compositions to be used in the protective films of the present invention comprise a block copolymer containing at least two poly(monovinyl aromatic hydrocarbon) blocks and at least one hydrogenated poly(conjugated) diene block, an optional tackifying resin, an optional polyolefin, an optional plasticizer and an optional antioxidant. The present invention further relates to a process for the manufacture of pellets for the manufacture of protective films that comprise said pressure sensitive adhesive compositions, a process for the manufacture of said protective films, and also shaped articles protected by said protective films.

DETAILED DESCRIPTION

The present invention relates to pressure sensitive adhesive compositions and to protective films containing a substrate and said pressure sensitive adhesive compositions. More specifically, the present invention relates to protective films containing a substrate and a pressure sensitive adhesive composition comprising:

(I) 100 parts by weight (pbw) of a block copolymer containing at least two poly(monovinyl aromatic hydrocarbon) blocks and at least one hydrogenated poly(conjugated) diene block, (II) 0 to 200 pbw of a tackifying resin, (III) 0 to 50 pbw of a polyolefin, (IV) 0 to 100 pbw of a plasticizer, and (V) 0 to 5 pbw of antioxidant Wherein at least one of components (II), (III), (IV), and (V) are present and wherein the block copolymer i. has a molecular structure according to the general formulae S-EB-S(1) or (S-EB)nX(2), wherein each S independently is a polymer block of predominantly styrene and EB is a hydrogenated polymer block of predominantly butadiene, n is an integer equal to or greater than 2, and X is the residue of a coupling agent, ii. has a poly(styrene) content from about 17 to about 24 wt %, iii. has an apparent molecular weight of the poly(styrene) blocks (S) from about 5,000 to about 11,000, iv. has an 1,2-addition degree (vinyl content) in the precursor poly(butadiene) block (EB) precursor from about 60 to about 85 (mole/mole), v. has an block EB that has a hydrogenation degree of at least about 80%, preferably of at least about 90%, and vi. has an optional diblock S-EB content of at most about 10 mole %, preferably of at most about 5 mole %, relative to the total block copolymer amount.

In an alternative preferred embodiment of the protective films of the present invention, the pressure sensitive adhesive composition comprises:

(I) 100 parts by weight (pbw) of a block copolymer containing at least two poly(monovinyl aromatic hydrocarbon) blocks and at least one hydrogenated poly(conjugated diene) block;

(II) 10 to 200 pbw of a tackifying resin;

(III) 0 to 50 pbw of a polyolefin, wherein the polyolefin has a melt flow rate of about 0.1-30 g/10 minutes (according to ASTM D-1238, Condition E, 190° C. at 2.16 kg load), and (IV) 0 to 5 pbw of antioxidant to produce a composition having a high peel adhesion (i.e., a Peel Adhesion 90 at 23° C. of at least 40 N/25 mm) with a MFR of from about 5 to about 20 g/10 min. (according to ASTM D-1238, Condition E, 190° C. at 2.16 kg load).

A further preferred embodiment of said protective films of the present invention utilizes a pressure sensitive adhesive composition that comprises:

(I) 100 parts by weight (pbw) of a block copolymer containing at least two poly(mono vinyl aromatic hydrocarbon) blocks and at least one hydrogenated poly(conjugated diene) block, (II) 20 to 70 pbw of a plasticizer, and (III) 0 to 5 pbw of an antioxidant.

In this embodiment, it is even more preferred to have a pressure sensitive adhesive composition that comprises from 15 to 50 pbw of a plasticizer per 100 pbw of block copolymer.

The present invention further relates to protective films consisting essentially of an adhesive layer and a substrate layer. If desired, the adhesive layer may further be covered with a protective laminated sheet such as siliconized paper.

The substrate layer is preferably an extrudable substrate layer. Examples include polyolefins such as polyethylene, polypropylene and copolymers of polyethylene and polypropylene. Among the non-limiting class of polyolefins which are included within the present invention to produce protective films include but are not limited to, for example, ethylene homopolymers and copolymers, propylene/alpha-olefin copolymers (i.e., propylene/buylene copolymers and propylene/ethylene/butylenes copolymers), and high impact polypropylene. Representative polyolefins include, for example, but are not limited to, substantially linear ethylene polymers, homogeneously branched linear ethylene polymers, heterogeneously branched linear ethylene polymers, including, but not limited to, linear low density polyethylenes (LLDPE), ultra or very low density polyethylenes (ULDPE or VLDPE), medium density polyethylenes (MDPE), high density polyethylenes (HDPE) and high pressure low density polyethylenes (LDPE).

Block Copolymer

With regard to the pressure sensitive adhesive compositions of the present invention, said compositions comprise a block copolymer comprising at least two poly(monovinyl aromatic hydrocarbon) blocks and at least one hydrogenated poly(conjugated)diene block and a variety of optional components selected from tackifying resins, polyolefins, plasticizers and antioxidants. The characterizing feature of the present invention is the hydrogenated styrenic block copolymer (also referred to hereinafter as hydrogenated poly (monovinyl aromatic hydrocarbon) block copolymer). The hydrogenated block copolymers used in the present adhesive composition are known. For instance said polymers are set forth in WO 03064527 and WO 03064528, which disclose a composition to be used for the manufacture of fibres, filaments, melt blown or spun bond non-wovens or cast or blown films, and from U.S. Pat. No. 5,777,043, which discloses sealant compositions, the entire disclosures of each incorporated herein by reference. Protective films and pressure sensitive adhesive compositions to be used for such films are not disclosed in WO 03064527, WO 03064528 or U.S. Pat. No. 5,777,043.

Adhesive compositions for the protective films according to the present invention comprise at least one block copolymer, derived from predominantly styrene and predominantly butadiene. As used throughout the specification with regard to the present invention, the phrase "predominantly styrene" references substantially pure styrene or a mixtures comprising at least 95 wt % of styrene and minor amounts of other comonomers. As used throughout the specification with regard to the present invention, the phrase "predominantly butadiene" references substantially pure butadiene or mixtures comprising at least 95 wt % of butadiene and minor amounts of other comonomers. The small proportions of other comonomers in the polystyrene blocks can consist of structurally related comonomers such as alpha-methyl styrene, p-methyl styrene, o-methyl styrene, p-tert.butyl styrene, dimethyl styrene and vinyl naphthalene, or butadiene. The small proportions of other comonomers in the poly(butadiene) block can consist of isoprene or styrene. However, preferred block copolymers to be applied according to the present invention, contain blocks of substantially pure styrene and substantially pure butadiene.

The block copolymer according to the present invention may be branched or linear and may be a triblock, tetrablock or multiblock. The block copolymer has a structure represented by the following general formulae S-EB-S(1) or (S-EB)$_n$X(2)

wherein each S independently is a polymer block of predominantly styrene, and EB is a hydrogenated polymer block of predominantly butadiene, having a hydrogenation degree of at least about 80%, preferably at least about 90% and more preferably more than about 95%, wherein n is an integer equal to or greater than 2 and wherein X is the residue of a coupling agent.

The polymer blocks S have an apparent molecular weight in the range of from about 5,000 to about 12,000, preferably from about 6,000 to about 11,000, even more preferably from about 5,000 to about 10,500.

In the block copolymers according to the present invention, the polystyrene content is from about 17 to about 24% w, preferably from about 19 to about 21% w, based on the total block copolymer. The 1,2 addition (vinyl content) in the midblock precursor is from about 60 to about 85%, preferably from about 65 to about 80%.

The complete block copolymers according to the present invention each preferably have a total apparent molecular weight (Mw, determined by Liquid High Performance Permeation Size Exclusion Chromatography (LHPSEC) and expressed in terms of polystyrene) ranging from about 80,000 to about 150,000, preferably from about 100,000 to about 150,000 (using the method according to ASTM D-5296-97).

The block copolymer to be used in the pressure adhesive compositions to be used for the protective films of the present invention, may be prepared by any method known in the art, including the well known full sequential polymerization method, optionally in combination with reinitiation and the coupling of living initially prepared pre-copolymers, as illustrated in e.g. U.S. Pat. No. 3,231,635, U.S. Pat. No. 3,251,905, U.S. Pat. No. 3,390,207, U.S. Pat. No. 3,598,887, U.S. Pat. No. 4,219,627, EP 0413294A2, EP 0387671B1, EP 0636654A1, and WO 94/22931, each incorporated herein by reference.

The block copolymers according to the present invention can also be made for example by coupling living diblock copolymers prepared by anionic polymerization with a coupling agent or by sequential polymerization. The latter is preferred. It will be appreciated that the block copolymers prepared by coupling living diblock copolymers by means of a coupling agent and termination of remaining living block copolymers will finally contain small amounts (i.e. less than about 10 mole % and preferably less than about 5 mole %) of diblock copolymer, having the same S blocks (mole % relative to the weight of the total block copolymer). As noted above, when sequential polymerization is used, the block copolymers to be used in the compositions of the present invention do not contain any detectable amount of diblock copolymer. When the block copolymers are prepared by coupling, the coupling agent may be any di- or polyfunctional coupling agent known in the art, for example dibromoethane, silicon tetrachloride, diethyl adipate divinylbenzene, dimethyldichlorosilane, methylchlorosilane, tetramethoxysilane, of which dibromobenzene, tetramethoxysilane and dimethylchlorosilane are preferred. Further preferred coupling agents in such a preparation route are non-halogen containing coupling agents such as gamma-glycidoxypropyltrimethoxysilane and diglycidylether of bisphenol A (e.g. EPON 825 and EPON 826, each commercially available from Hexion Specialty Chemicals, formerly Resolution Performance Products).

The anionic polymerization of the conjugated diene hydrocarbons is typically controlled with structure modifiers such as diethyl ether or ethyl glyme (1,2-diethoxyethane), to obtain the desired amount of 1,2-addition. As described in Re 27,145, which is incorporated herein by reference, the level of 1,2-addition of a butadiene polymer or copolymer can greatly affect elastomeric properties after hydrogenation. The 1,2-addition of butadiene polymers significantly and surprisingly additionally influences the polymer as described above. More particularly, a 1,2-addition of 78% (within the scope of this invention) is achieved during polymerization by the presence of about 300 ppm of 1,2-diethoxypropane (DEP) in the final solution.

In general, the polymers useful in this invention may be prepared by contacting the monomer or monomers with an organoalkali metal compound in a suitable solvent at a temperature from about −150° C. to about 300° C., preferably at a temperature from about 0° C. to about 100° C. Particularly effective polymerization initiators are organolithium compounds having the general formula $$R\,Li$$

wherein R is an aliphatic, cycloaliphatic, alkyl-substituted cycloaliphatic, aromatic or alkyl-substituted aromatic hydrocarbon radical having from 1 to 20 carbon atoms of which sec.butyl is preferred.

Suitable solvents include those useful in the solution polymerization of the polymer and include aliphatic, cycloaliphatic, alkyl-substituted cycloaliphatic, aromatic and alkyl-substituted aromatic hydrocarbons, ethers and mixtures thereof. Suitable solvents, then, include aliphatic hydrocarbons such as butane, pentane, hexane and heptane, cycloaliphatic hydrocarbons such as cyclopentane, cyclohexane and cycloheptane, alkyl-substituted cycloaliphatic hydrocarbons such as methylcyclohexane and methylcycloheptane, aromatic hydrocarbons such as benzene and the alkyl-substituted hydrocarbons such as toluene and xylene, and ethers such as tetrahydrofuran, diethylether and di-n-butyl ether. Preferred solvents are cyclopentane or cyclohexane.

It will be appreciated that the EB blocks in the finally applied block copolymers preferably have been selectively hydrogenated to a degree of at least about 95%, whereas the poly(styrene) blocks have not been hydrogenated or only in a degree of at most about 5%. The hydrogenation of these polymers may be carried out by a variety of well established processes including hydrogenation in the presence of such catalysts as Raney Nickel, noble metals such as platinum and palladium and soluble transition metal catalysts. Suitable hydrogenation processes which can be used are ones wherein the diene-containing polymer or copolymer is dissolved in an inert hydrocarbon diluent such as cyclohexane and hydrogenated by reaction with hydrogen in the present of a soluble hydrogenation catalyst. Such processes are disclosed in U.S. Pat. No. 3,113,986, U.S. Pat. No. 4,226,952 and U.S. Pat. Reissue No. 27,145, the disclosures of which are incorporated herein by reference. The polymers are hydrogenated in such a manner as to produce hydrogenated polymers having a residual unsaturation content in polydiene blocks of less than 5 percent by weight, preferably less than 1% wt and more preferably as close to 0 percent as possible, of their original unsaturation content prior to hydrogenation. A titanium catalyst such as disclosed in U.S. Pat. No. 5,039,755, which is incorporated herein by reference, may also be used in the hydrogenation process.

The finally applied selectively hydrogenated block copolymers can also consist of mixtures of linear block copolymers or mixtures of linear block copolymers and branched block copolymers.

Optional Components

A variety of optional components can also be included in the adhesive compositions of the present invention. Suitable tackifying resins that may be utilized include those that are compatible with the hydrogenated poly(conjugated diene) block of the present invention and are selected from the group consisting of compatible $C_5$ hydrocarbon resins, hydrogenated C$_5$ hydrocarbon resins, styrenated C$_5$ resins, C$_5$/C$_9$ resins, styrenated terpene resins, fully hydrogenated or partially hydrogenated C9 hydrocarbon resins, rosin esters, rosin derivatives and mixtures thereof. The tackifying resin must have a MMAP cloud point that is at least 45° C. in order for the polymer/resin blend to be compatible. Commercially available hydrocarbon tackifying resins that meet this requirement include PICCOTAC 95 aliphatic resin (MMAP=95° C.); REGALREZ resin series, such as REGALREZ 1085 (85° C.) and REGALREZ 6108 (54° C.) and REGALITE resin series such as V-1100 (48° C.), REGALITE S-260 (59° C.), REGALITE R1100 and REGALITE R1125 (each 99° C.), as well as ARKON P 140 RESIN (REGALREZ, REGALITE, PICCOTAC and ARKON are trademarks). Preferred tackifying resins have a softening point as determined by the Ring and Ball method (according to ASTM E-28) in the range of from 75 to 140° C., such as REGALITE R 101, REGALITE R1100 and REGALITE R1125 and ARKON P140 resins. As noted, the tackifying resin is optional. However, when one or more tackifying resins are present, they are preferably used in proportions of from 10 to 200 parts by weight, more preferably from 20 to 100 party by weight, even more preferably from 40 to 80 parts by weight, per 100 parts by weight of block copolymer.

Polyolefins are also an optional component in the adhesive composition of the present invention. The polyolefins that are useful in the practice of the present invention are those generally derived from α-olefins having from 2 to 4 carbon atoms, preferably polymers of butylenes, more preferably butylene-1, optionally mixed with other α-olefin copolymers and having a high molecular weight of from about 0.1 to about 30, preferably from about 0.5 to about 20, in terms of melt index MI, g/10 min (according to ASTM D-1238, Condition E at 190° C. at 2.16 kg load). While a variety of polyolefins may be utilized (depending upon the formulation to be utilized), the preferred poly(α-olefin) polymers in many instances are polybutene-1 homopolymer or copolymers. More preferably, a polybutene-1 copolymer is applied having a crystallinity of less than about 80%. Crystallinity is determined with wide-angel X-ray diffraction after 7 days. Preferably the crystallinity is from about 0 to about 60%. Preferably, the polybutene-1 (polybutylene) referred to herein is one butene-1 polymer containing from about 80%, preferably from about 95% and more preferably from about 97% by weight of isotactic portions. The weight average molecular weight typically ranges from about 60,000 to about 1,000,000 g/mol, determined by Gel Permeation Chromatography, using polybutene-1 standards. Suitable polybutene-1's also have a density of from about 0.875 to about 0.925, preferably from about 0.890 to about 0.920. Suitable polybutene-1's have melt flow indices from about 0.05 to about 400, preferably from about 0.05 to about 300, more preferably from about 0.1 to about 200, even more preferably from about 0.2 to about 20, and most preferably from about 0.4 to about 5 dg/min, as determined by ASTM D-1238 Condition E, at 190 C and 2.16 kg. The intrinsic viscosity of the polybutene-1 may be greater than about 0.07, preferably greater than about 7 at 130° C. in "decalin" (decahydronaphthalene). Such polybutene-1 polymers, including their methods of preparation and their properties, are known in the art. An exemplary reference containing additional information on polybutylene is U.S. Pat. No. 4,960,820, the entire content of which is incorporated herein by reference. As noted above the polybutene-1 polymer (PB) usable herein can be either a butene-1 homopolymer or copolymer. If a butene-1 copolymer is used, the non-butene comonomer content is from about 1 to about 50 mole %, preferably from about 1 to about 30 mole % of either ethylene, propylene, or an alpha olefin having from 5 to 8 carbon atoms. The polybutene-1's can be modified to increase surface activity by reaction with, for example, maleic anhydride. Suitable polybutene-1's can be obtained, for example, in accordance with Ziegler-Natta low-pressure polymerization of butene-1, e.g. by polymerizing butene-1 with catalysts of TiCl$_3$ or TiCl$_3$—AlCl$_3$ and Al(C$_2$H$_5$)$_2$Cl at temperatures of 10-100° C., preferably 20-40° C., e.g. according to the process described in DE-A-1,570,353. It can also be obtained, for example by using TiCl$_4$—MgCl$_2$ catalysts. High melt indices are obtainable by further processing the polymer by peroxide cracking, thermal treatment or irradiation to induce scissions leading to a higher melt flow material. Polybutene-1 PB-8310 and PB-0300, marketed by Montell are particularly suitable polymers. PB-8310 is a copolymer of butene-1 and 6 mole % ethylene, with a melt index of 3.0 g/10 min. at 190° C. and 2.16 kg, a crystallinity of 34% and a density of 0.895. PB-0300 is a homopolymer of butene-1, with a melt index of 4.0 g/10 min. at 190° C. and 2.16 kg, a crystallinity of 55% and a density of 0.915. The polybutene-1 homopolymer typically has a crystallinity of at least 30% by weight when measured with wide-angle X-ray diffraction after 7 days, but preferably less than 70% by weight.

Those polyolefins of a low molecular weight or in the form of wax have been found not to be successfully applied and are accordingly outside of the scope of the present invention. The polyolefins used according to the present invention preferably comprises minimal low molecular weight products. More particularly, the content of low molecular weight products extracted in n-pentane under reflux at a boiling point on n-pentane, is preferably lower than 1.0 wt %. When the content of the low molecular weight product exceeds 1.0 wt %, the tackiness of the complete composition is deteriorated as the temperature changes and time goes on and its adhesive strength is lowered.

As indicated above, the use of polyolefins in the adhesive compositions is optional. When polyolefins are utilized, the proportion of polyolefin is from 0.01 to 50 parts by weight per 100 parts by weight of block copolymer, preferably from 10 to 50 parts by weight, more preferably from 25 to 50 parts by weight per 100 parts by weight of block copolymer.

Plasticizers are well known to those skilled in the art and are also optional components in the formulations of the present invention. Typically, the hardness of polymer compound is decreased by adding a plasticizer. The plasticizer is typically compatible with at least the hydrogenated conjugated diene block(s) of the block copolymer (I).

Examples of plasticizers commonly used include oil, preferably naphtenic or paraffinic oil (carbon aromatic distribution ≦5%, preferably ≦2%, more preferably 0% as determined according to DIN 51378), more preferably paraffinic oil. Examples of alternative plasticizers which may be used in the present invention are, oligomers of randomly or sequentially polymerised styrene and conjugated diene, oligomers of conjugated diene, such as butadiene or isoprene, liquid polybutene-1, and ethylene-propylene-diene rubber, all having a weight average molecular weight from about 300 to about 35,000, preferably from about 300 to about 25,000, more preferably from about 500 to about 10,000. Particularly preferred oils are white mineral oils. When plasticizers are utilized, the proportion of plasticizer is from 1 to 100 parts by weight per 100 parts by weight of block copolymer, preferably from 10 to 80 parts by weight, more preferably from 20 to 70 parts by weight per 100 parts by weight of block copolymer.

Antioxidants are also optional components in the formulations of the present invention. More in particular anti-oxidants such as IRGANOX 1330 or 1010, or YOSHINOX 425, or SUMILIZER GS can be present in the adhesive composition in amounts of from 0.1 to 5 parts by weight, preferably from 0.1 to 5 parts by weight per 100 parts by weight of block copolymers. (IRGANOX, YOSHINOX and SUMILIZER are trademarks).

Additional Optional Components

The adhesive composition may further comprise a poly(monovinyl aromatic block) compatible resin in an amount of from 0 to 40 parts by weight per 100 parts by weight of block copolymer and preferably from 10 to 40 parts by weight and more preferably from 20 to 40 parts by weight. Such resins are well known to those skilled in the art. Examples of suitable resins include coumarone-indene resin, polyindene resin, poly(methyl indene) resin, polystyrene resin, vinyltoluene-alphamethylstyrene resin, alphamethylstyrene resin and polyphenylene ether, in particular poly(2,6-dimethyl-1,4-phenylene ether). Poly(monovinyl aromatic hydrocarbon) compatible resins are e.g. sold under the trademarks HERCURES, ENDEX, KRISTALLEX, NEVCHEM and PICCOTEX.

The adhesive composition may also further comprise a dusting agent in an amount from 0.1 to 10% by weight, more preferably from 0.2 to 5% by weight, basis the total composition. The dusting agent is a very fine powder having on average a particle size between 1 nm and 100 µm, preferably between 5 nm and 10 µm. By using a dusting agent, an adhesive composition which is free flowing can be obtained. As used herein the term "free flowing adhesive composition" refers to an adhesive composition of the present invention which contains a dusting agent and in which the particles of the composition do not adhere to one another. In principle any such fine powder may be employed but it is preferred that a polyolefin, such as polyethylene, silica, talc or calcium carbonate powder is used. Examples of commercially available silica powders include, but are not limited to, AEROSIL R972 (average particle size about 16 nm), AEROSIL 200 (average particle size about 12 nm), SIPERNAT, DUROSIL, DUREX and ULTRASIL (average particle size about 16 nm) (AEROSIL, SIPERNAT, DUROSIL, DUREX and ULTRASIL are trademarks). Examples of commercially available calcium carbonate powders include, but are not limited to, DURCAL 5 (average particle size about 6 µm) and MILLICARB (average particle size about 3 µm) (DURCAL and MILLICARB are trademarks). The dusting agent is typically used in an amount of from 0.05 to 10% by weight, preferably from 0.1 to 5% by weight, based on total weight of the composition.

In addition to the above mentioned components, the adhesive composition may contain one or more auxiliary components such as stabilisers, flame retardants, anti-blocking agents and anti-slipping agents. These components are typically present in an amount from 0.1 to 5% by weight, preferably 0.1 to 1% by weight, basis the total adhesive composition.

It will be appreciated that even further aspects of the present invention exist with regard to the pressure sensitive adhesive compositions that comprise one or more of the hereinbefore specified components (block copolymers containing at least two poly(monovinyl aromatic hydrocarbon) blocks and at least one hydrogenated poly(conjugated)diene block, tackifying resins, polyolefins, plasticizers, and antioxidants) besides the protective films of the present invention. More specifically, a process for the manufacture of pellets comprising the hereinbefore specified pressure sensitive adhesive compositions, said pellets to be further processed in the manufacture of the protective films; a process for the manufacture of said protective films, and also shaped articles protected by the protective films as specified hereinbefore.

With regard to the process for preparing pellets containing the above adhesive composition, said process involves the use of an extruder and an underwater pelletizer. Extruders are well known to those skilled in the art and are commercially available. Preferably, the extruder is a twin-screw extruder, more preferably a co-rotating twin-screw extruder. Underwater pelletizers are also well known to those skilled in the art and are commercially available. Other pelletizers such as face cutters and strand granulators have been found to be less suitable as use of face cutters or strand granulators does not result in uniform pellet size distributions. Furthermore, most of the adhesive compositions have the tendency to agglomerate in a face cutter or stick to the knives of a strand granulator, preventing easy production of these adhesive compositions in pellet form.

According to one embodiment, the present invention relates to a process for preparing pellets containing an adhesive composition comprising:

(i) dry-blending a block copolymer containing at least two poly(monovinyl aromatic hydrocarbon) blocks and at least one hydrogenated poly(conjugated diene) block, with 10 to 80 parts by weight of an tackifying resin per 100 parts by weight of block copolymer, up to 50 parts by weight of a polybutene-1 per 100 parts by weight of block copolymer, and optionally up to 40 parts by weight of aromatic resin per 100 parts by weight of block copolymer to obtain a dry-blend;

(ii) extruding the dry-blend in an extruder to obtain an extrudate;

(iii) pelletizing the extrudate with an underwater pelletizer to obtain wet pellets; and (iv) drying the wet pellets to obtain pellets containing the adhesive composition, and optionally treating the wet or dry pellets with a dusting agent in an amount of 0.1 to 10% by weight of the total composition.

According to another embodiment, the present invention relates to a process for preparing pellets containing an adhesive composition comprising:

(i) adding a block copolymer containing at least two poly(monovinyl aromatic hydrocarbon) blocks and at least one hydrogenated poly(conjugated diene) block, 10 to 80 parts by weight of an tackifying resin per 100 parts by weight of block copolymer or 20 to 60 parts by weight of a plasticizer, and optionally 10 to 50 parts by weight of a polybutene-1 per 100 parts by weight of block copolymer, and optionally up to 40 parts by weight of aromatic resin per 100 parts by weight of block copolymer to separate feed inlet openings in an extruder;

(ii) blending and extruding the components in the extruder to obtain an extrudate;

(iii) pelletizing the extrudate with an underwater pelletizer to obtain wet pellets; and (iv) drying the wet pellets to obtain pellets containing the adhesive composition, and optionally treating the wet or dry pellets with a dusting agent in an amount of 0.1 to 10% by weight of the total composition.

According to another aspect, the present invention relates to a process for preparing a protective film by co-extrusion of an extrudable substrate layer and an adhesive layer as defined herein, which process comprises feeding an adhesive composition to form the adhesive layer to a first extruder and feeding the substrate composition to form the substrate layer to a second extruder, melting the adhesive composition and the substrate composition and conveying the substantially molten adhesive composition and substrate composition with the first and second extruder respectively, at the same time to a die in hydraulic communication with the first and second extruder and co-extruding a film comprising the adhesive layer and the substrate layer. The die is preferably a multi-manifold die. The extrusion process downstream of the first and second extruder is typically a cast film process or a blown film process. Both processes are well known in the art and have been described in the Encyclopaedia of Chemical Technology (Kirk-Othmer), 1996, volume 19, in the chapter on plastic processing, pages 290-316, which pages are herein incorporated by reference.

In the process for producing pellets with an underwater pelletizer it has been found advantageous to add an antifoaming agent and a detergent to the pelletizer water to avoid agglomeration of the pellets.

Another aspect of the present invention is formed by shaped articles covered with the protective films as specified herein before.

The invention will now be further illustrated with reference to the following examples, however, without restricting its scope to these embodiments.

EXAMPLES

Pellets containing an adhesive composition were prepared by first dry-blending a block copolymer, a hydrogenated tackifying resin, a polyolefin and an antioxidant in a tumbler mixer for 30 minutes. The dry-blend thus obtained was fed into a MARIS (trademark) single port twin-screw extruder fitted with a GALA (trademark) underwater pelletizer. A detergent and an antifoaming agent (TEGO anti foam 1488 0.01% by weight in HORDAMER PE03 soap) was added to the pelletizer water to avoid agglomeration of the wet pellets (TEGO and HORDAMER are trademarks). The wet pellets were dried by centrifugal drier with dry air flow. Talc or polyethylene powder was added as a dusting agent.

The block copolymers A and B used in the examples are selectively hydrogenated block copolymers, derived from styrene and butadiene, characterized by respectively:
1. a triblock copolymer obtained by full sequential polymerisation, having poly(styrene) blocks with each an apparent molecular weight of 10,000, a total apparent molecular weight of 135,000, a vinyl content in the poly(butadiene) block before hydrogenation of 68% and a poly(styrene) content of 20%;
2. a hydrogenated triarmed block copolymer (S-EB)$_3$X, comprising S blocks in the arms of an apparent molecular weight of 6,200, having a total apparent molecular weight of 148,000, a vinyl content before hydrogenation of 77% and a poly(styrene) content of 20%.

The polyolefin used in the Examples is polybutene-1 copolymer PB 0300, marketed by Montell.

The tackifying resins used in the Examples are REGALITE R1125 and ARKON P140 respectively and IRGANOX NG 1330 was used as an antioxidant.

The following pellets were made and the Shore A hardness and the Melt Flow Rate were determined as listed in Tables 1-3.

In the specified comparative examples (a)-(d) the commercially available block copolymer KRATON G-1730 was used.

TABLE 1

Comparative Examples

|  | a | b | c | d |
|---|---|---|---|---|
| KRATON G1730* | 100 | 100 | 100 | 100 |
| block copol. A | 0 | 0 | 0 | 0 |
| block copol. B |  | 0 | 0 | 0 |
| REGALITE R1125 | 48 | 60 | 60 | 48 |
| ARKON P140 |  | 0 | 0 | 0 |
| PB0300 | 12 | 12 | 0 | 0 |
| IRGANOX NG1330 | 0.5 | 0.5 | 0.5 | 0.5 |
|  | 160.5 | 172.5 | 160.5 | 148.5 |
| Hardness, Shore A | 49 | 42 | 37 | 44 |
| PA90, 23° C., N/25 mm | 13 | 20 | 40 (±6) | 24 |
| PA90, 60° C., N/25 mm | 18 | 23 | 31 (±1) | 37 |
| MFR, 190° C., g/10 min, 190° C., 2.16 kg | 7.5 | 11 | 16.5 | 8.5 |

*A commercial block copolymer grade, used until now in adhesive compositions for protective films.
Specified PA values are maxima.
Tests were performed 24 hours after application.
MFR measured using ASTM D-1238, condition E.

TABLE 2

Examples

|  | 1 | 2 | 3 | 4 |
|---|---|---|---|---|
| KRATON G1730* | 0 | 0 | 0 | 0 |
| block copol. A | 100 | 100 | 100 | 100 |
| block copol. B | 0 | 0 | 0 | 0 |
| REGALITE R1125 | 48 | 60 | 60 | 48 |
| ARKON P140 | 0 | 0 | 0 | 0 |
| PB0300 | 12 | 12 | 0 | 0 |
| IRGANOX NG1330 | 0.5 | 0.5 | 0.5 | 0.5 |
|  | 160.5 | 172.5 | 160.5 | 148.5 |
| Hardness, Shore A | 24 | 26 | 27 | 29 |
| PA90, 23° C., N/25 mm | 28 | 68 | 64 | 66 |
| PA90, 60° C., N/25 mm | 31 | 73-backing break | 70-backing break | 66 |
| MFR g/10 min, 190° C., 2.16 kg | <1 | 1.5 | 1.5 | <1 |
| MFR g/10 min, 190° C., 5 kg | <1 | 5.5 | 5 | 2.5 |

MFR measured using ASTM D-1238, condition E.

TABLE 3

Examples (cont.)

|  | 5 | 6 | 7 | 8 |
|---|---|---|---|---|
| KRATON G1730* | 0 | 0 | 0 | 0 |
| block copol. A | 0 | 0 | 0 | 0 |
| block copol. B | 100 | 100 | 100 | 100 |
| REGALITE R1125 | 60 | 48 | 0 | 0 |
| ARKON P140 | 0 | 0 | 60 | 48 |
| PB0300 | 0 | 0 | 0 | 0 |
| IRGANOX NG1330 | 0.5 | 0.5 | 0.5 | 0.5 |
|  | 160.5 | 148.5 | 160.5 | 148.5 |
| Hardness, Shore A | 31 | 33 | 36 | 35 |
| PA90, 23° C., N/25 mm | 45 | 52 | 52-zip | 50-zip |
| PA90, 60° C., N/25 mm | 48 | 60 | 70-backing break | 70-backing break |
| MFR g/10 min, 190° C., 2.16 kg | 24 | 16 | 18 | 10 |

MFR measured using ASTM D-1238, condition E.

What is claimed:

1. A protective film in the form of a tape or sheet comprising a substrate layer and a pressure sensitive adhesive composition, said pressure sensitive adhesive comprising:

(I) 100 parts by weight (pbw) of a block copolymer containing at least two poly(monovinyl aromatic hydrocarbon) blocks and at least one hydrogenated poly(conjugated) diene block, (II) 0 to 200 pbw of a tackifying resin, (III) 0 to 50 pbw of a polyolefin, (IV) 0 to 100 pbw of a plasticizer, and (V) 0 to 5 pbw of antioxidant, wherein at least one of (II), (III), (IV) and (V) are present in said pressure sensitive adhesive composition; and wherein the block copolymer of said pressure sensitive adhesive composition i. has a molecular structure according to the general formulae S-EB-S(1) or (S-EB)nX(2), wherein each S independently is a polymer block of predominantly styrene and EB is a hydrogenated polymer block of predominantly butadiene, n is an integer equal to or greater than 2, and X is the residue of a coupling agent, ii. has a poly(styrene) content (PSC) from 17 to 24 wt %, iii. has an apparent molecular weight of the poly(styrene) blocks (S) that is in the range of from 5,000 to 12,000, iv. has an 1,2-addition degree (vinyl content) in the precursor poly(butadiene) block (EB) precursor is in the range of from 60 to 85 (mole/mole), v. has a block EB that has a hydrogenation degree of at least 80%, and vi. has an optional diblock S-EB content of at most 10 mole %, relative to the total block copolymer amount.

2. The protective film of claim 1 wherein the pressure adhesive composition comprises:

two poly(monovinyl aromatic hydrocarbon) blocks and at least one hydrogenated poly(conjugated diene) block;

(II) 10 to 200 pbw of a tackifying resin;

(III) 0 to 50 pbw of a polyolefin, wherein the polyolefin has a melt index of about 0.1-30 g/10 minutes (ASTM D-1238, Condition E at 190° C. at 2.16 kg load), and (V) 0 to 5 pbw of antioxidant.

3. The protective film of claim 1 wherein the pressure adhesive composition comprises:

(I) 100 parts by weight (pbw) of a block copolymer containing at least two poly(mono vinyl aromatic hydrocarbon) blocks and at least one hydrogenated poly(conjugated diene) block, (IV) 20 to 70 pbw of a plasticizer, and (V) 0 to 5 pbw of antioxidant.

4. The protective film of claim 2 wherein the pressure sensitive adhesive composition shows a combination of high peel adhesion (i.e. PA 90 at 23° C. of at least 40 N/25 mm) and a melt flow rate of from 5 to 20 g/10 min. (measured according to ASTM D-1238, Condition E at 190° C. at 2.16 kg load).

5. The protective film of claim 2 wherein the tackifying resin has a softening point as determined by the Ring and Ball method (ASTM E-28) from 75 to 140° C.

6. The protective film of claim 2 wherein the plasticizer is selected from naphthenic oils and paraffinic oils.

7. The protective film of claim 2 wherein the poly($\alpha$-olefin) polymer is a poly(butene-)homopolymer or copolymer.

8. The protective film of claim 2 wherein the block copolymer(s) applied in the pressure adhesive composition have a polystyrene content from 19 to 21% and an 1,2-addition (vinyl) content in the midblock precursor from 65 to 75%.

9. A pressure sensitive adhesive composition to be used as a component of protective films, said pressure sensitive adhesive composition comprising:

(I) 100 parts by weight (pbw) of a block copolymer containing at least two poly(monovinyl aromatic hydrocarbon) blocks and at least one hydrogenated poly(conjugated) diene block, (II) 0 to 200 pbw of a tackifying resin, (III) 0 to 50 pbw of a polyolefin, (IV) 0 to 100 pbw of a plasticizer, and (V) 0 to 5 pbw of antioxidant, wherein at least one of (II), (III), (IV) and (V) are present and wherein the block copolymer i. has a molecular structure according to the general formulae S-EB-S(1) or (S-EB)nX(2), wherein each S independently is a polymer block of predominantly styrene and EB is a hydrogenated polymer block of predominantly butadiene, n is an integer equal to or greater than 2, and X is the residue of a coupling agent, ii. has a poly(styrene) content (PSC) from 17 to 24 wt %, iii. has an apparent molecular weight of the poly(styrene) blocks (S) that is in the range of from 5,000 to 12,000, iv. has an 1,2-addition degree (vinyl content) in the precursor poly(butadiene) block (EB) precursor is in the range of from 60 to 85 (mole/mole), v. has a block EB that has a hydrogenation degree of at least 80% and vi. has an optional diblock S-EB content of at most 10 mole %, relative to the total block copolymer amount.

10. The pressure sensitive adhesive composition of claim 9 which shows a combination of high peel adhesion (i.e. PA 90 at 23° C. of at least 40 N/25 mm) and a melt flow rate of from 5 to 20 g/10 min. (measured according to ASTM 1238-D).

11. Shaped articles protected by the protective films according to claim 1.

* * * * *